(12) United States Patent
Zhang

(10) Patent No.: US 9,684,140 B2
(45) Date of Patent: Jun. 20, 2017

(54) OPTICAL DEVICE AND OPTIC TRANSCEIVER DEVICE

(71) Applicants: Hisense Broadband MultiMedia Technologies Co., Ltd., Qingdao, Shandong (CN); Hisense USA Corp., Suwanee, GA (US); Hisense International Co., Ltd., Qingdao, Shandong (CN)

(72) Inventor: Haixiang Zhang, Shandong (CN)

(73) Assignees: Hisense Broadband Multimedia Technologies Co., Ltd., Qingdao (CN); Hisense USA Corp., Suwanee, GA (US); Hisense International Co., Ltd., Qingdao (CN)

( * ) Notice: Subject to any disclaimer, the term of this patent is extended or adjusted under 35 U.S.C. 154(b) by 0 days.

(21) Appl. No.: 14/943,273

(22) Filed: Nov. 17, 2015

(65) Prior Publication Data
US 2016/0282573 A1   Sep. 29, 2016

(30) Foreign Application Priority Data
Mar. 27, 2015   (CN) .......................... 2015 1 0140537

(51) Int. Cl.
*G02B 27/10*   (2006.01)
*G02B 6/42*   (2006.01)
(Continued)

(52) U.S. Cl.
CPC .......... *G02B 6/4214* (2013.01); *G02B 6/262* (2013.01); *G02B 6/4295* (2013.01); *G02B 27/14* (2013.01)

(58) Field of Classification Search
None
See application file for complete search history.

(56) References Cited

U.S. PATENT DOCUMENTS 4,431,258 A * 2/1984 Fye .................... G02B 6/29349
359/589
4,805,027 A * 2/1989 Sluyter .................. A61B 1/042
348/341
(Continued)

FOREIGN PATENT DOCUMENTS

CA         2177787 A1   3/1997
CN       102183828 A    9/2011
(Continued)

OTHER PUBLICATIONS

Office Action for Chinese Application No. 2015101405372, Dec. 14, 2015.
(Continued)

*Primary Examiner* — Mike Stahl
(74) *Attorney, Agent, or Firm* — Brinks Gilson & Lione

(57) ABSTRACT

An optical device and an optic transceiver device are provided. The optical device includes a light splitting surface. The optical device further includes a first surface and a second surface disposed opposite to each other and parallel to each other. The light splitting surface separately intersects the first surface and the second surface. An angle between the light splitting surface and the first surface is not equal to 90 degrees. A medium between the light splitting surface and the first surface and a medium between the light splitting surface and the second surface are the same. The medium is formed by a light transmissive material.

13 Claims, 5 Drawing Sheets

(51) Int. Cl.
*G02B 27/14* (2006.01)
*G02B 6/26* (2006.01)

(56) References Cited

U.S. PATENT DOCUMENTS

| | | | | |
|---|---|---|---|---|
| 5,117,474 A | * | 5/1992 | van den Bergh | G02B 6/4222 385/33 |
| 5,367,399 A | * | 11/1994 | Kramer | G02B 26/106 250/236 |
| 5,686,990 A | * | 11/1997 | Laznicka, Jr. | G01C 19/721 356/460 |
| 6,097,521 A | * | 8/2000 | Althaus | G02B 6/4246 359/618 |
| 6,985,647 B2 | * | 1/2006 | Takamori | G02B 6/423 385/14 |
| 2004/0022282 A1 | * | 2/2004 | Lano | H01S 5/0687 372/32 |
| 2005/0117201 A1 | * | 6/2005 | Yamane | G02B 6/29362 359/333 |
| 2009/0226137 A1 | | 9/2009 | Abel et al. | |
| 2016/0085028 A1 | * | 3/2016 | Zhou | G02B 6/4215 398/34 |

FOREIGN PATENT DOCUMENTS

| | | |
|---|---|---|
| CN | 102474357 A | 5/2012 |
| CN | 104459904 A | 3/2015 |
| DE | 4232327 A1 | 3/1994 |
| JP | 2002-357782 A * | 12/2002 |

OTHER PUBLICATIONS

Office Action for Chinese Application No. 2015101405372, Apr. 25, 2016.

* cited by examiner

OPTICAL DEVICE AND OPTIC TRANSCEIVER DEVICE

CROSS-REFERENCE TO RELATED APPLICATION

This application claims priority to Chinese Patent Application No. 201510140537.2, filed on Mar. 27, 2015, which is hereby incorporated by reference in its entirety.

TECHNICAL FIELD

The present disclosure relates to the field of optical fiber communications technologies, and more specifically to an optical device and an optic transceiver device.

BACKGROUND

In an optical fiber communications system, an optic device is currently applied, light path filtering parts of which are all designed in a wave plate manner. As shown in FIG. 1, the optic device includes a laser emitter 11, a first wave plate 12, a detector 13, a second wave plate 14 and an optical fiber adapter 15. A central axis 16-1 of an emitting end of the laser emitter 11 and a central axis 16-2 of a receiving end of the optical fiber adapter 15 are parallel to each other, but are not coincident. The first wave plate 12 is disposed between the laser emitter 11 and the optical fiber adapter 15, and an angle is between the first wave plate 12 and the emitting end of the laser emitter 11 and between the first wave plate 12 and the receiving end of the optical fiber adapter 15. The second wave plate 14 disposed parallel to a receiving end of the detector 13 is a filter, and filters optical signals that are from the optical fiber adapter 15 and are reflected by the first wave plate 12, and after the optical signals from the optical fiber adapter 15 pass through the second wave plate 14, some of the optical signals pass through the receiving end of the detector 13 and enter the detector 13.

As shown in FIG. 2, optical signals emitted by the laser emitter include a central axis ray 21, an edge ray 22 and an edge ray 23, where the edge ray 22 and the edge ray 23 are symmetrical relative to the central axis ray 21. An angle between a light path of the optical signals emitted by the laser emitter and an optical axis 24-1 of a wave plate 24 is 45 degrees, and therefore when the central axis ray 21 of the optical signals is incident at 45 degrees relative to the wave plate 24, the edge ray 22 and the edge ray 23 separately have different incident angles relative to the optical axis 24-1 of the wave plate 24, where an incident angle of the edge ray 22 relative to the optical axis 24-1 of the wave plate 24 is $\theta_1$, an incident angle of the edge ray 23 relative to the optical axis 24-1 of the wave plate 24 is $\theta_2$, and $\theta_1 \neq \theta_2$.

According to the light refraction law, incident angles of the central axis ray 21, the edge ray 22 and the edge ray 23 relative to the optical axis 24-1 of the wave plate 24 are 45 degrees, $\theta_1$ and $\theta_2$ respectively, and the wave plate 24 has a same refraction index, and therefore after the central axis ray 21, the edge ray 22 and the edge ray 23 are emitted from the wave plate 24, different refraction angles are separately generated, where a refraction angle generated after the edge ray 22 passes through the wave plate 24 is maximum, a refraction angle generated after the edge ray 23 passes through the wave plate 24 is minimum, and a refraction angle generated after the central axis ray 21 passes through the wave plate 24 is between the refraction angle generated after the edge ray 22 passes through the wave plate 24 and the refraction angle generated after the edge ray 23 passes through the wave plate 24. The refraction angle generated after the edge ray 22 passes through the wave plate 24 and the refraction angle generated after the edge ray 23 passes through the wave plate 24 are different, and therefore a ray generated after the edge ray 22 passes through the wave plate 24, and a ray generated after the edge ray 23 passes through the wave plate 24 and a ray generated after the central axis ray 21 passes through the wave plate 24 are not symmetrical. Therefore, the central axis ray 21, the edge ray 22 and the edge ray 23 cannot converge to a same point of a central optical axis at a focal point of a receiving end of an optical fiber adapter, and what are shown by 25 in FIG. 2 are focal points in which dislocation occurs.

In the existing technology, when a light beam passes through a wave plate disposed between a laser emitter and an optical fiber adapter, and then forms a converged light spot, because edge rays at two sides of a central axis ray have different refraction angles after passing through the wave plate, focal points of the edge rays at the two sides cannot converge to a point with that of the central axis ray, a focal spot is formed, thereby affecting efficiency of coupling optical signals.

SUMMARY

In a first aspect of the present disclosure, an optical device includes a light splitting surface, and a first surface and a second surface that are disposed opposite to each other and parallel to each other. The light splitting surface separately intersects the first surface and the second surface, and an angle between the light splitting surface and the first surface is not equal to 90 degrees. A medium between the light splitting surface and the first surface and a medium between the light splitting surface and the second surface are the same, and the medium is formed by a light transmissive material.

In a second aspect of the present disclosure, an optic transceiver device includes the foregoing optical device, a laser emitter, and an adapter. The optical device is located between the laser emitter and the adapter. An emitting end of the laser emitter and a receiving end of the adapter are perpendicular to a first surface and a second surface of the optical device respectively.

BRIEF DESCRIPTION OF THE DRAWINGS

To illustrate the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF THE DRAWINGS

Figure 1:
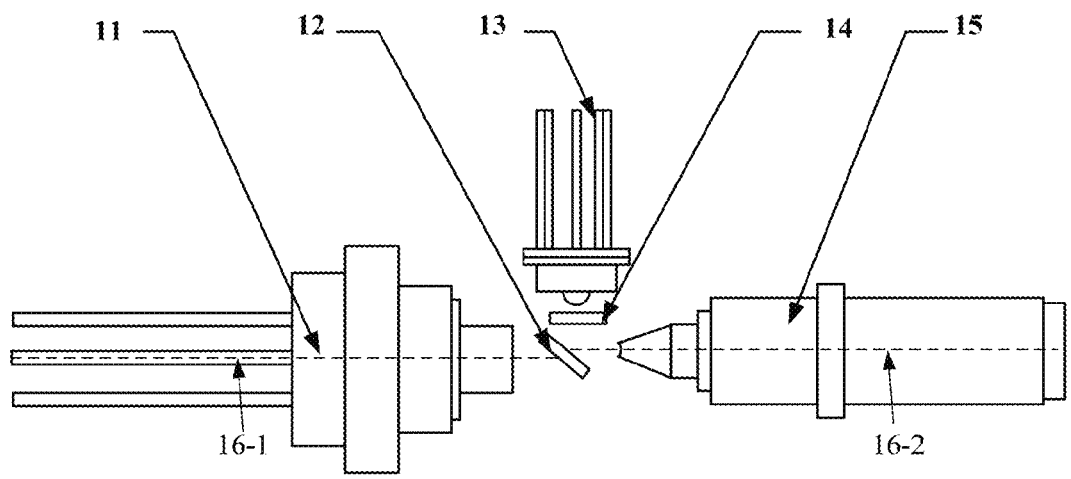
FIG. 1 is a schematic structural diagram of an optic transceiver device in the existing technology.
Figure 2:
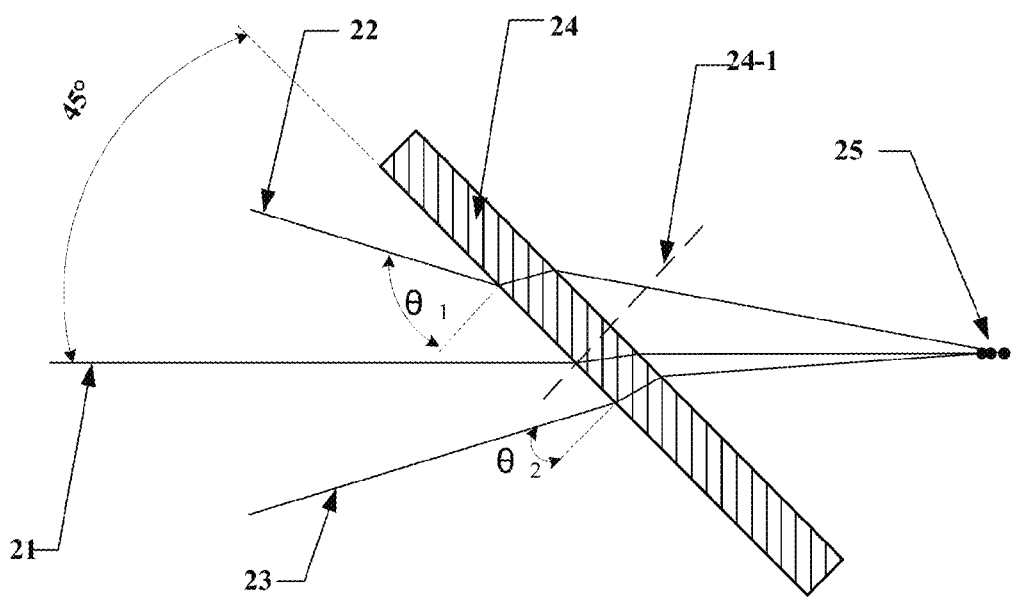
FIG. 2 is a schematic diagram of light path transmission of a wave plate shown in FIG. 1.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. section 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the description of the present disclosure, it should be understand that positions and positional relationships indicated by the terms such as "center", "above", "below", "in front of", "behind", "left", "right", "vertical", "horizontal", "top", "bottom", "inside", "outside" are based on the position or positional relationship shown in the accompany drawings, which are used only for convenient and brief description, and do not indicate or imply that the indicated apparatus or element must be in a specific position, and must be constructed and operated in a specific position. In addition, in embodiments of the present disclosure, an inner end and an outer end are both defined according to directions of signals in a transmission path, that is, according to directions of signals in a transmission path, one end for inputting signals is defined as the outer end or a signal input end of the transmission path, and another end for outputting signals is defined as the inner end or a signal output end. Of course, other names may be defined according to principles, and thus the foregoing cannot be understood as a limitation on the present disclosure.

Embodiments of the present disclosure provide an optical device and an optic transceiver device, which are used for solving a problem in the existing technology that focal points of edge rays at two sides cannot converge to a point with that of a central axis ray, so that a focal spot is formed, thereby affecting efficiency of coupling optical signals.

To make the objectives, technical solutions, and beneficial effects of the present disclosure more comprehensible, the following further describes the present disclosure in detail with reference to the accompanying drawings and embodiment. It is understandable that the specific embodiment is only used to explain the present disclosure and is not intended to limit the present disclosure.

Figure 3A:
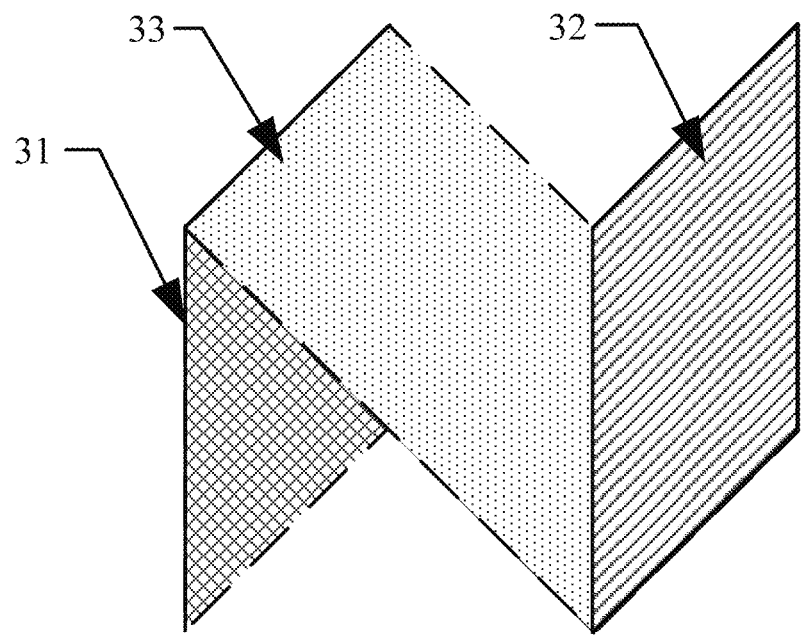
FIG. 3a is a schematic structural diagram of an optical device provided in an embodiment of the present disclosure.

FIG. 3a schematically shows a schematic structural diagram of an optical device provided in an embodiment of the present disclosure.

As shown in FIG. 3a, the optical device provided in this embodiment of the present disclosure mainly includes: a first surface 31 and a second surface 32 disposed opposite to each other and parallel to each other, and a light splitting surface 33. The light splitting surface 33 separately intersects the first surface 31 and the second surface 32, and an angle between the light splitting surface 33 and the first surface 31 is not equal to 90 degrees, that is, the light splitting surface 33 cannot be perpendicular to the first surface 31. The first surface 31 and the second surface 32 are disposed opposite to each other and parallel to each other, and therefore an angle between the light splitting surface 33 and the second surface 32 is not equal to 90 degrees either, and the angle between the light splitting surface 33 and the first surface 31 is equal to the angle between the light splitting surface 33 and the second surface 32.

As shown in FIG. 3a, a medium between the light splitting surface 33 and the first surface 31 and a medium between the light splitting surface 33 and the second surface are the same, and the medium between the light splitting surface 33 and the first surface 31 and the medium between the light splitting surface 33 and the second surface are formed by a light transmissive material, such as, quartz glass, optical glass, or K9 glass.

As shown in FIG. 3a, the light splitting surface may be plated with a light reflective film. If a surface of the light splitting surface 33 opposite to the first surface 31 is plated with a light reflective film, when passing through the light splitting surface 33, a light beam incident from the first surface 31 may be reflected by the light splitting surface 33, thereby changing a transmission path of the light beam. However, when a light beam incident from the second surface 32 passes through the light splitting surface 33, because a surface of the light splitting surface 33 opposite to the second surface 32 is not plated with any reflective film, the light splitting surface 33 does not play a role of reflecting the light beam from the second surface 32. The light splitting surface 33 is formed by a light transmissible material, and therefore, the light beam from the second surface 32 may pass through the light splitting surface 33, and be emitted directly from the first surface 31. If a surface of the light splitting surface 33 opposite to the second surface 32 is plated with a light reflective film, when passing through the light splitting surface 33, a light beam incident from the second surface 32 may be reflected by the light splitting surface 33, thereby changing a transmission path of the light beam. However, when a light beam incident from the first surface 31 passes through the light splitting surface 33, because a surface of the light splitting surface 33 opposite to the first surface 31 is not plated with any reflective film, the light splitting surface 33 does not play a role of reflecting the light beam from the first surface 31. The light splitting surface 33 is formed by a light transmissible material, and therefore, the light beam from the first surface 31 may pass through the light splitting surface 33, and be emitted directly from the second surface 32.

Figure 3B:
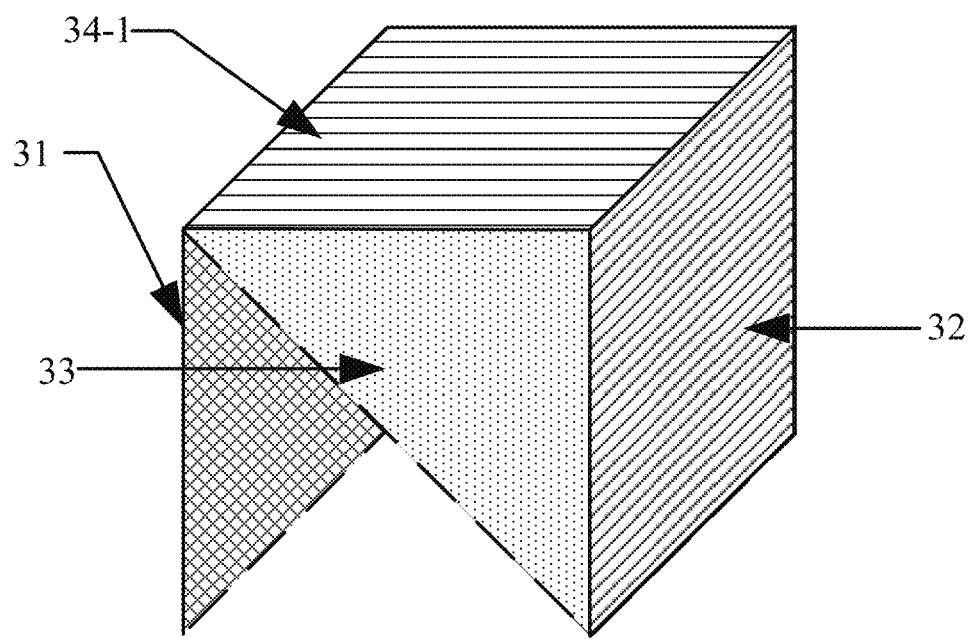
FIG. 3b is a schematic structural diagram of another optical device provided in an embodiment of the present disclosure.
Figure 3C:
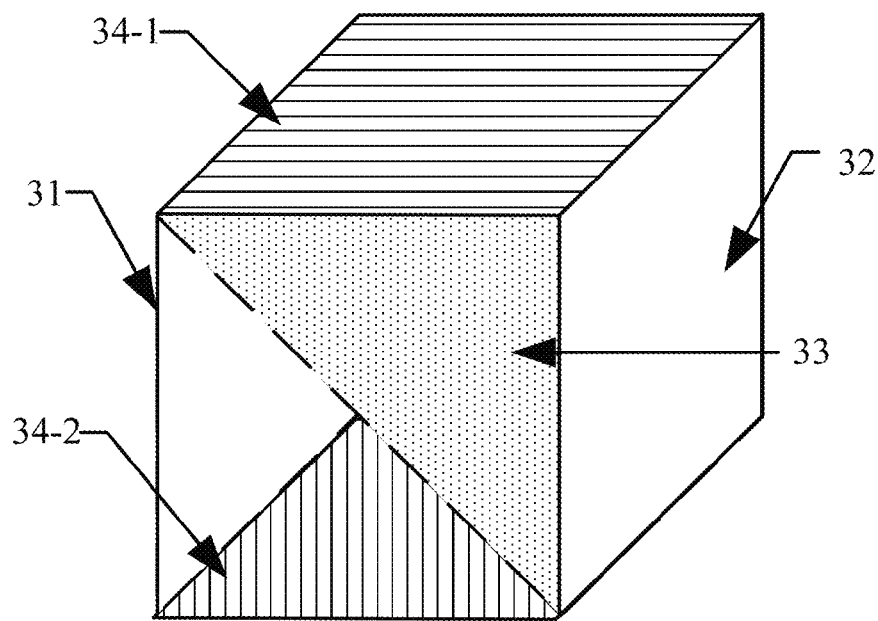
FIG. 3c is a schematic structural diagram of another optical device provided in an embodiment of the present disclosure.

As shown in FIG. 3b and FIG. 3c, the optical device may further include a third surface 34-1 or 34-2, where the third surface 34-1 or 34-2 is located at a side of the light splitting surface 33 plated with a reflective film, that is, the third surface 34-1 or 34-2 needs to be disposed a side of a reflecting surface of the light splitting surface 33, and is used to receive a light beam reflected from the light splitting surface 33.

As shown in FIG. 3b and FIG. 3c, if a surface of the light splitting surface 33 opposite to the second surface 32 is plated with a reflective film, after being reflected by the light splitting surface 33, a light beam from the second surface 32 is emitted from third surface 34-1; if a surface of the light splitting surface 33 opposite to the first surface 31 is plated with a reflective film, after being reflected by the light splitting surface 33, a light beam from the first surface 31 is emitted from the third surface 34-2.

As shown in FIG. 3b and FIG. 3c, the optical device may have only one third surface 34-1 or 34-2, and the one surface that is disposed needs to be located at a side of the reflecting surface of the light splitting surface 33; or, the optical device may have two third surfaces 34-1 or 34-2, where one of the surfaces is located at a side of the reflecting surface of the light splitting surface 33, and the other of the surfaces is located at another side of the reflecting surface of the light splitting surface.

Further, as shown in FIG. 3b, the third surface 34-1 may be perpendicular to the first surface 31. The first surface 31 and the second surface 32 are two surfaces disposed opposite to each other and parallel to each other, and therefore, when the third surface 34-1 is perpendicular to the first surface 31, the third surface 34-1 is necessarily perpendicular to the second surface 32.

Further, the first surface 31 of the optical device provided in this embodiment of the present disclosure may be square, and the second surface 32 may also be square, where side lengths of the first surface 31 and the second surface 32 are not specifically limited in this embodiment of the present disclosure.

An embodiment of the present disclosure provides an optical device, including a light splitting surface, and a first surface and a second surface that are disposed opposite to each other and parallel to each other, where the light splitting surface separately intersects the first surface and the second surface, and an angle between the light splitting surface and the first surface is not equal to 90 degrees; and a medium between the light splitting surface and the first surface and a medium between the light splitting surface and the second surface are the same, and the medium is formed by a light transmissive material. In the foregoing embodiment, when a first light beam is incident from the first surface of the optical device onto the light splitting surface of the optical device, the light splitting surface transmits the first light beam and emits the first light beam from the second surface of the optical device; if a second light beam is incident from the second surface of the optical device onto the light splitting surface of the optical device, a light splitting surface of a light splitter reflects the second light beam, and changes a transmission light path of the second light beam. The first surface and the second surface of the optical device are disposed opposite to each other, and parallel to each other, and therefore if an optical axis of the first light beam and the first surface of the optical device are perpendicular to each other, and the light splitting surface of the optical device transmits the first light beam, the first light beam may be emitted from the second surface of the optical device, and a transmission light path of the first light beam does not change. Correspondingly, when two edge rays symmetrical relative to the first light beam are incident onto the first surface of the optical device, the two edge rays have a same incident angle; after the two edge rays enter the optical device, because the two edge rays have the same incident angle, and the optical device is forming by light transmissive materials with a same medium, the two edge rays have a same refraction angle after passing through the first surface of the optical device, and the two edge rays are transmitted from the light splitting surface of the optical device, and then are incident onto the second surface of the optical device. The two edge rays have a same refraction angle after passing through the first surface of the optical device, and therefore, these two edge rays have a same incident angle after being incident onto the second surface of the optical device, and correspondingly, these two edge rays also have a same refraction angle after passing through the second surface of the optical device. These two edge rays are symmetrical relative to the first light beam before being incident onto the first surface of the optical device, and these two edge rays have a same refraction angle after being emitted from the second surface of the optical device, and therefore, these two edge rays are still symmetrical with the first light beam as a symmetrical axis. When the first light beam and the edge rays symmetrical relative to the first light beam converge, they may converge to a point, thereby reducing deformation of the focal spot, and improving efficiency of coupling optical signals.

Figure 4A:
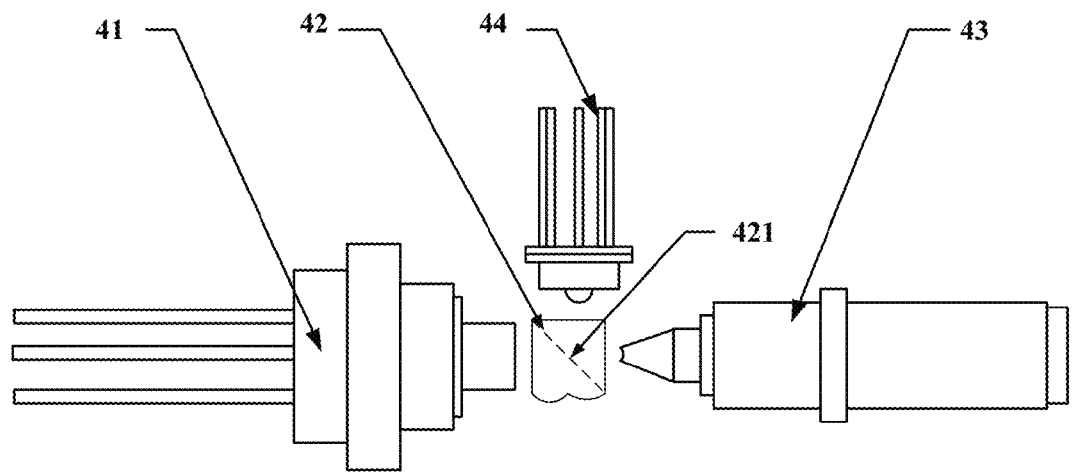
FIG. 4a is a schematic structural diagram of an optic transceiver device provided in an embodiment of the present disclosure.

Based on the same inventive conception, an embodiment of the present disclosure further provides an optic transceiver device, as shown in FIG. 4a, including a laser emitter 41, an optical device 42 and an optical fiber adapter 43.

As shown in FIG. 4a, the optical device 42 is located between the laser emitter 41 and the optical fiber adapter 43, where an emitting end of the laser emitter 41 is perpendicular to a first surface (not shown in FIG. 4a) of the optical device 42, and correspondingly, a receiving end of the optical fiber adapter 43 is perpendicular to a second surface (not shown in FIG. 4a) of the optical device 42; or, the emitting end of the laser emitter 41 is perpendicular to the second surface (not shown in FIG. 4a) of the optical device 42, and correspondingly, the receiving end of the optical fiber adapter 43 is perpendicular to the first surface (not shown in FIG. 4a) of the optical device 42. The foregoing description is not specifically limited in this embodiment of the present disclosure.

Further, as shown in FIG. 4a, the laser emitter 41 and the optical fiber adapter 43 are disposed on a horizontal line and opposite to each other, where the optical device 42 is located between the laser emitter 41 and the optical fiber adapter 43, and therefore, the laser emitter 41, the optical device 42 and the optical fiber adapter 43 are also disposed on a horizontal line and opposite to each other.

Further, the optic transceiver device further includes a detector, and a receiving end of the detector is perpendicular to a third surface of the optical device.

Figure 4B:
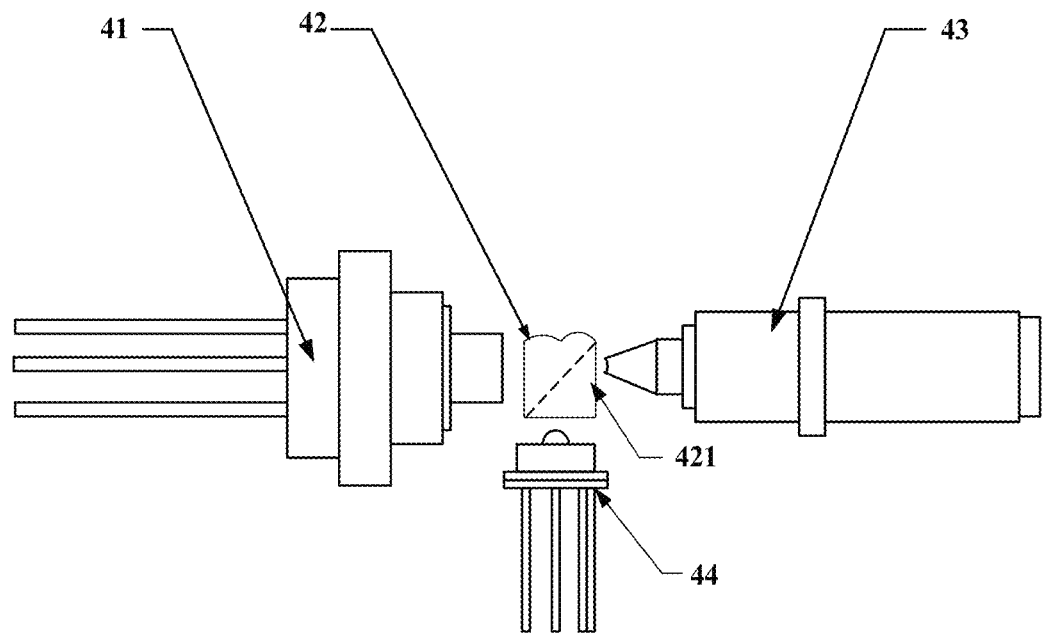
FIG. 4b is another schematic structural diagram of an optic transceiver device provided in an embodiment of the present disclosure.

As shown in FIG. 4a, the receiving end of the detector 44 is perpendicular to the third surface of the optical device 42, a reflecting surface of a light splitting surface 421 of the optical device 42 is disposed opposite to the optical fiber adapter 43, and the reflecting surface of the light splitting surface 421 is horizontally upward, and therefore, the light splitting surface 421 of the optical device 42 plays a role of reflecting a light beam from the optical fiber adapter 43. After being reflected by the light splitting surface 421 of the optical device, the light beam from the optical fiber adapter 43 is emitted through the third surface (not shown in FIG. 4a) of the optical device. The receiving end of the detector 44 is perpendicular to the third surface of the optical device 42, and therefore the light beam emitted from the optical device 42 may be partially incident into the detector 44. Alternatively, as shown in FIG. 4b, a reflecting surface of a light splitting surface 421 of the optical device 42 is disposed opposite to the optical fiber adapter 43, and the reflecting surface of the light splitting surface 421 is horizontally downward, and therefore, the light splitting surface 421 of the optical device 42 plays a role of reflecting a light beam from the optical fiber adapter 43. After being reflected by the light splitting surface 421 of the optical device, the light beam from the optical fiber adapter 43 is emitted through the third surface (not shown in FIG. 4a) of the optical device. The receiving end of the detector 44 is perpendicular to the third surface of the optical device 42, and therefore the light beam emitted from the optical device 42 may be partially incident into the detector 44. The orientation of the reflecting surface of the light splitting surface of the optical device is not specifically limited in this embodiment of the present disclosure.

Figure 5:
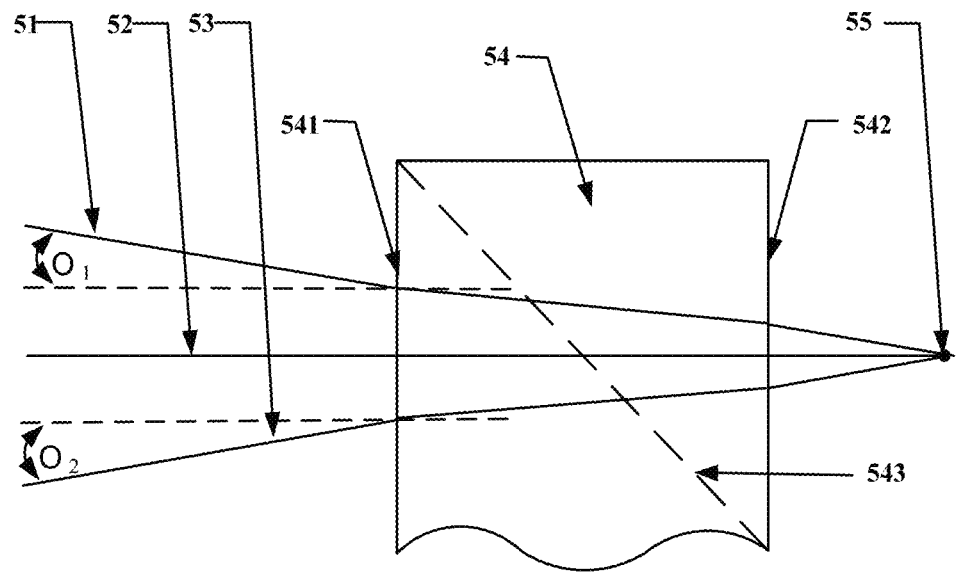
FIG. 5 is a schematic diagram of light path transmission of a light beam emitted by a laser emitter in an optic transceiver device shown in FIG. 4a and FIG. 4b of the present disclosure.

FIG. 5 is a schematic diagram of light path transmission of a light beam emitted by a laser emitter in an optic transceiver device shown in FIG. 4a and FIG. 4b of the present disclosure. The first light beam emitted by the laser emitter 41 shown in FIG. 4a or FIG. 4b is used as an example. As shown in FIG. 5, the first light beam is denoted by a central axis ray 52, an edge ray 51 and an edge ray 53, where the central axis ray 52 is located at a location of an optical axis of the first light beam, and the edge ray 51 and the edge ray 53 are symmetrical relative to the central axis ray 52. Moreover, an incident angle of the edge ray 51 relative to a first surface 541 of an optical device 54 is $o_1$, and an incident angle of the edge ray 53 relative to the first surface 541 of the optical device 54 is $o_2$. The optical axis of the first light beam emitted by the laser emitter and the first surface 541 of the optical device 54 are perpendicular to each other, and therefore in this embodiment of the present disclosure, the incident angle of the edge ray 51 relative to the first surface 541 of the optical device 54 and the incident angle of the edge ray 53 relative to the first surface 541 of the optical device 54 are equal, so that $o_1=o_2$. As shown in FIG. 5, the first surface 541 of the optical device 54 and the optical axis of the first light beam emitted by the laser emitter are perpendicular to each other, and the edge ray 51 and the edge ray 53 in the first light beam have a same incident angle relative to the first surface 541 of the optical device 54. Therefore, according to the light refraction law, when the first light beam emitted by the laser emitter is incident into the optical device 54, a transmission light path of the central axis ray 52 is kept consistent with the optical axis of the first light beam. The edge ray 51 and the edge ray 53 have a same incident angle relative to the first surface 541 of the optical device 54, and therefore the edge ray 51 and the edge ray 53 have a same refraction angle relative to the optical device 54. Moreover, the optical device 54 is formed by a same as light transmissive medium, and therefore, the edge ray 51 and the edge ray 53 are separately transmitted along a same refraction angle direction after passing through the first surface 541 of the optical device 54.

As shown in FIG. 5, when the central axis ray 52, the edge ray 51 and the edge ray 53 are transmitted to a light splitting surface 543 of the optical device 54, because a reflecting surface of the light splitting surface 543 of the optical device 54 and a second surface 542 of the optical device 54 are disposed opposite to each other, the light splitting surface 543 of the optical device 54 does not play a role of reflecting the central axis ray 52, the edge ray 51 and the edge ray 53. After passing through the light splitting surface 543 of the optical device 54, the central axis ray 52, the edge ray 51 and the edge ray 53 are transmitted onto the second surface 542 of the optical device 54, because the first surface 541 of the optical device 54 and the second surface 542 of the optical device 54 are parallel to each other, the central axis ray 52 is perpendicularly emitted out of the second surface 542 of the optical device 54 along the optical axis of the first light beam. The edge ray 51 and the edge ray 53 have a same refraction angle when being propagated in the optical device 54, and therefore the edge ray 51 and the edge ray 53 still have a same refraction angle after being emitted out of the second surface 542 of the optical device 54.

As shown in FIG. 5, the edge ray 51 and the edge ray 53 have an equal refraction angle and are symmetrical relative to the central axis ray 52 when being emitted out of the second surface 542 of the optical device 54, and therefore after passing through the second surface 542 of the optical device 54, the edge ray 51 and the edge ray 53 can converge to a point with the central axis ray 52, and 55 in FIG. 5 is a focal spot formed after the central axis ray 52, the edge ray 51 and the edge ray 53 pass through the optical device 54.

Figure 6:
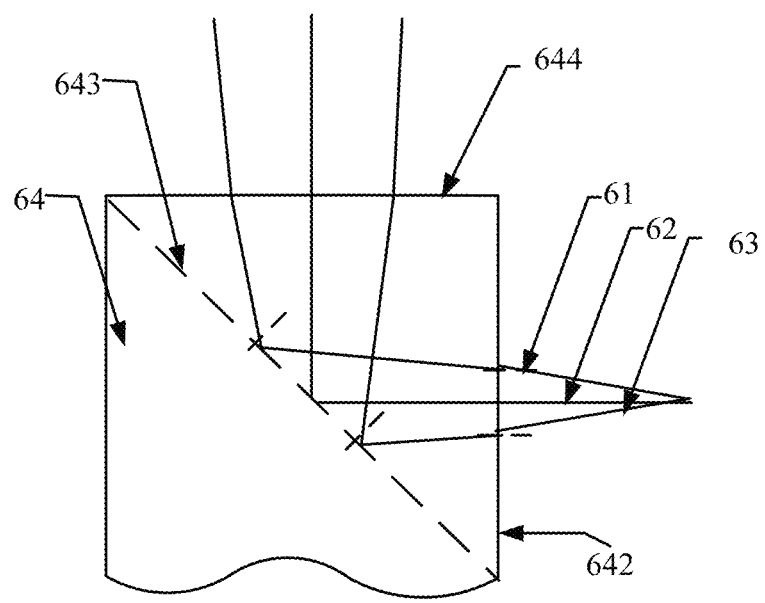
FIG. 6 is a schematic diagram of light path transmission of a light beam emitted by an optical fiber adapter in an optic transceiver device shown in FIG. 4a and FIG. 4b of the present disclosure.

FIG. 6 is a schematic diagram of light path transmission of a light beam emitted by an optical fiber adapter in an optic transceiver device shown in FIG. 4a and FIG. 4b of an embodiment of the present disclosure. The second light beam emitted by the optical fiber adapter 43 shown in FIG. 4a or FIG. 4b is used as an example. As shown in FIG. 6, the second light beam is denoted by a central axis ray 62, an edge ray 61 and an edge ray 63, where the central axis ray 62 is located at a location of an optical axis of the second light beam, and the edge ray 61 and the edge ray 63 are symmetrical relative to the central axis ray 62. Moreover, an incident angle of the edge ray 61 relative to a second surface 642 of an optical device 64 is equal to an incident angle of the edge ray 63 relative to the second surface 642 of the optical device 64. The optical axis of the second light beam emitted by the laser emitter and the second surface 642 of the optical device 64 are perpendicular to each other, and therefore in this embodiment of the present disclosure, the incident angle of the edge ray 61 relative to the second surface 642 of the optical device 64 and the incident angle of the edge ray 63 relative to the second surface 642 of the optical device 64 are equal. As shown in FIG. 6, the second surface 642 of the optical device 64 and the optical axis of the second light beam emitted by the optical fiber adapter are perpendicular to each other, and the edge ray 61 and the edge ray 63 in the second light beam have a same incident angle relative to the second surface 642 of the optical device 64. Therefore, according to the light refraction law, when the second light beam emitted by the optical fiber adapter is incident into the optical device 64, a transmission light path of the central axis ray 62 is kept consistent with the optical axis of the second light beam. The edge ray 61 and the edge ray 63 have a same incident angle relative to the second surface 642 of the optical device 64, and therefore the edge ray 61 and the edge ray 63 have a same refraction angle relative to the optical device 64. Moreover, the optical device 64 is formed by a same as light transmissive medium, and therefore, the edge ray 61 and the edge ray 63 are separately transmitted along a same refraction angle direction after passing through the second surface 642 of the optical device 64.

As shown in FIG. 6, when the central axis ray 62, the edge ray 61 and the edge ray 63 are transmitted to a light splitting surface 643 of the optical device 64, because a reflecting surface of the light splitting surface 643 of the optical device 64 and a second surface 642 of the optical device 64 are disposed opposite to each other, the light splitting surface 643 of the optical device 64 plays a role of reflecting the central axis ray 62, the edge ray 61 and the edge ray 63. After the central axis ray 62, the edge ray 61 and the edge ray 63 are incident onto the light splitting surface 643 of the optical device 64, it may be determined according to the light reflecting law that an angle between the central axis ray 62 and the light splitting surface 643 of the optical device 64 is 45 degrees, and therefore, after being reflected by the light splitting surface 643 of the optical device 64, the central axis ray 62 may continue to be propagated along an optical axis perpendicular to the optical axis of the second light beam, and after a propagation direction of the central axis ray 62 is changed in the optical device 64, the central axis ray 62 is perpendicularly emitted from a third surface 644 of the optical device 64. The edge ray 61 and the edge ray 63 are symmetrical relative to the central axis ray 62, and have a same refraction angle when being propagated in the optical device 64, and therefore, when the edge ray 61 and the edge ray 63 are propagated to the light splitting surface 643 of the optical device 64, the edge ray 61 and the edge ray 63 are reflected by the light splitting surface 643 of the optical device 64, propagation directions of the edge ray 61 and the edge ray 63 that are reflected are changed in the optical device 64, the edge ray 61 and the edge ray 63 whose propagation directions are changed and the central axis ray 62 whose propagation direction is changed are successively emitted out of the third surface 644 of the optical device 64. Finally, the rays partially enter a receiving end of a detector perpendicular to the third surface 644 of the optical device 64.

According to an optic transceiver device in the foregoing embodiment, the optical device disposed between the laser emitter and the adapter has the first surface and the second surface disposed opposite to each other and parallel to each other, the laser emitter and the adapter are disposed on a horizontal line and opposite to each other, and the emitting end of the laser emitter and the receiving end of the adapter are perpendicular to the first surface and the second surface of the optical device respectively, and therefore the first light beam emitted from the laser emitter may be perpendicularly incident onto the light splitting surface of the optical device from the first surface of the optical device; two edge rays symmetrical relative to the first light beam may also be incident onto the light splitting surface of the optical device from the first surface of the optical device, and after being refracted by the first surface of the optical device, the two edge rays symmetrical relative to the first light beam are incident onto the light splitting surface of the optical device, where after being refracted by the first surface of the optical device, the two symmetrical edge rays have a same refraction angle. The light splitting surface of the optical device transmits the first light beam, and therefore, the first light beam and the two edge rays symmetrical relative to the first light beam may pass through the light splitting surface of the optical device and reach the second surface of the optical device. The first surface and the second surface of the optical device are parallel to each other, and therefore, after passing through the light splitting surface of the optical device, the first light beam may be perpendicularly incident onto the second surface of the optical device. Correspondingly, after being refracted by the first surface of the optical device, the two symmetrical edge rays of the first light beam have a same refraction angle, and therefore, after passing through the light splitting surface of the optical device and when being incident onto the second surface of the optical device, the two symmetrical edge rays of the first light beam still have a same incident angle. In this case, after being refracted by the second surface of the optical device, the two edge rays symmetrical relative to the first light beam still have a same refraction angle, and therefore after passing through the optical device, the first light beam and the two edge rays symmetrical relative to the first light beam can converge to a point with the first light beam, thereby reducing deformation of the focal spot, and improving efficiency of coupling optical signals. The optic transceiver device provided in this embodiment of the present disclosure can reduce deformation of the focal spot, thereby reducing the quantity of components forming the optic device, and simplifying the technique process.

Apparently, various modifications and variations can be made by persons skilled in the art without departing from the spirit and scope of the present disclosure. In this way, if the modifications and variations made to the present disclosure fall in the scope of the claims and equivalent technology thereof, the present disclosure is also intended to cover the modifications and variations.

What is claimed is:
1. An optical device, comprising:
   a first surface;
   a second surface that is disposed opposite to and parallel to the first surface;
   a light splitting surface comprising a light transmissible material, wherein:

the light splitting surface separately intersects the first surface and the second surface, an angle between the light splitting surface and the first surface is not equal to 90 degrees, the light splitting surface comprises a first side opposite to the first surface and a second side opposite to the second surface, the light splitting surface is plated with a light reflective film on the second side opposite to the second surface so that:

first light from the first surface passes through the light splitting surface and is emitted from the second surface, second light from the second surface is reflected by the light splitting surface and changes a transmission path of the second light, and the first light is convergent light; and a medium between the light splitting surface and the first surface and a medium between the light splitting surface and the second surface are the same, and the medium is formed by a light transmissive material.

2. The optical device according to claim 1, further comprising a third surface, where the third surface is located at a side of a reflecting surface of the light splitting surface.

3. The optical device according to claim 2, where the third surface is perpendicular to the first surface.

4. The optical device according to claim 1, where an angle between the light splitting surface and the first surface is 45 degrees.

5. The optical device according to claim 1, where the first surface is square, and the second surface is square.

6. An optic transceiver device, comprising:
an optical device;
a laser emitter; and
an adapter,
wherein the optical device comprises:
a first surface;
a second surface that is disposed opposite to and parallel to the first surface;
a light splitting surface comprising a light transmissible material, wherein:
the light splitting surface separately intersects the first surface and the second surface,
an angle between the light splitting surface and the first surface is not equal to 90 degrees,
the light splitting surface comprises a first side opposite to the first surface and a second side opposite to the second surface,
the light splitting surface is plated with a light reflective film on the second side opposite to the second surface so that:
first light from the first surface passes through the light splitting surface and is emitted from the second surface,
second light from the second surface is reflected by the light splitting surface and changes a transmission path of the second light, and
the first light is convergent light; and
a medium between the light splitting surface and the first surface and a medium between the light splitting surface and the second surface are the same, and the medium is formed by a light transmissive material;
the optical device is located between the laser emitter and the adapter; and
an emitting end of the laser emitter and a receiving end of the adapter are arranged such that an optical axis of light emitted by the laser emitter and an optical axis of light received by the adapter are each perpendicular to the first surface and the second surface of the optical device respectively.

7. The optic transceiver device according to claim 6, further comprising a detector, wherein
a receiving end of the detector is arranged such that an optical axis of light received by the detector is perpendicular to a third surface of the optical device.

8. The optic transceiver device according to claim 6, where the laser emitter and the adapter are disposed on a horizontal line and opposite to each other.

9. The optic transceiver device according to claim 7, wherein the third surface of the optical device is located at a side of a reflecting surface of the light splitting surface.

10. The optic transceiver device according to claim 9, where the third surface of the optical device is perpendicular to the first surface of the optical device.

11. The optic transceiver device according to claim 6, where an angle between the light splitting surface and the first surface of the optical device is 45 degrees.

12. The optic transceiver device according to claim 6, where the first surface of the optical device is square, and the second surface of the optical device is square.

13. The optic transceiver device according to claim 6, where the light from the emitting end of the laser emitter is convergent light.

* * * * *